(12) United States Patent
Buter

(10) Patent No.: US 8,851,271 B2
(45) Date of Patent: Oct. 7, 2014

(54) RESTRICTOR CLIP

(75) Inventor: Germ Buter, Alkmaar (NL)

(73) Assignee: Ammeraal Beltech Modular A/S, Vejle (DK)

( * ) Notice: Subject to any disclaimer, the term of this patent is extended or adjusted under 35 U.S.C. 154(b) by 201 days.

(21) Appl. No.: 13/082,838

(22) Filed: Apr. 8, 2011

(65) Prior Publication Data

US 2012/0031739 A1 Feb. 9, 2012

(51) Int. Cl.
*B65G 13/02* (2006.01)
*B65G 17/08* (2006.01)

(52) U.S. Cl.
CPC .......... *B65G 17/086* (2013.01); *B65G 2207/12* (2013.01)
USPC ........... 198/778; 198/834; 198/850; 198/852; 198/853

(58) Field of Classification Search
USPC .............. 198/853, 852, 831, 850, 844.2, 819, 198/833, 834, 690.2, 822, 36.1, 808; 101/35; 53/134; 224/271
See application file for complete search history.

(56) References Cited

U.S. PATENT DOCUMENTS

| | | | |
|---|---|---|---|
| 5,738,205 A * | 4/1998 | Dræbel | 198/852 |
| 5,906,267 A * | 5/1999 | Heit et al. | 198/781.05 |
| 7,234,589 B2 * | 6/2007 | Sedlacek | 198/841 |
| 7,766,159 B2 * | 8/2010 | Krisl | 198/853 |
| 2006/0272931 A1 | 12/2006 | Knott et al. | |
| 2010/0083466 A1 * | 4/2010 | Andersen et al. | 16/266 |

FOREIGN PATENT DOCUMENTS

EP 1377408 6/2009

* cited by examiner

*Primary Examiner* — Gene Crawford
*Assistant Examiner* — Lester Rushin
(74) *Attorney, Agent, or Firm* — James Creighton Wray

(57) ABSTRACT

Conveyor belts are made from modular links having offset forward and rearward projecting eye parts to intercalate eye parts from one belt link between eye parts with oval lateral apertures. Connecting rods inserted through aligned apertures hingedly connect adjacent links. Clips restrict lateral turning of the belt links. Clips have general U-shapes with two legs, a bridge portion end, and opposite free ends. Projecting members at the free ends have lengths parallel to the legs and smaller than the lengths of the apertures in the belt links in which the clip is to be installed, and have heights equivalent to or smaller than the heights of the aperture in the belt link in which the clip is to be installed. The lateral distance between the two legs of the U, is larger than the lateral extent of an eye part in the belt link in which the clip is installed.

8 Claims, 4 Drawing Sheets

RESTRICTOR CLIP

This application claims the benefit of Danish Application No. PA 2010 00294 filed Apr. 8, 2010, which is hereby incorporated by reference in its entirety as if fully set forth herein.

FIELD OF THE INVENTION

The present invention relates to a restrictor clip for use in conveyor belts constructed by connecting a plurality of substantially identical modular beltings particularly for use where the conveyor belt is used in a spiral device such as for example a spiral freezer or spiral oven.

BACKGROUND OF THE INVENTION

In a spiral oven or freezer the conveyor belt in the forward run follows a well-defined spiral path such that the conveyor belt turns around a central tower/drum on the inside and on the outside the belt is limited by a guide rail or similar device. This causes the side flex conveyor belt to be exposed to tension along the outside edge of the belt whereas the inside edge of the belt which is lying against the drum is substantially slack, i.e. is not exposed to any tensile forces. The belt is driven, typically by friction between the inside edge of the belt and a drum arranged centrally in the spiral device. Due to the position of the drive on the inside of the spiral path, the flexible conveyor belt will collapse on the inside in order to transfer the drive force to the entire belt width. In practice this causes wobbling and bending especially of the inside portion of the belt and at the same time causes tension in the outside of the belt. The buckling occurs due to the fact that these types of conveyor belts are constructed from a plurality of interconnected modular belt links where the connection is created in a hinge-like manner by a hinge or connection pin inserted laterally through overlapping/superposed apertures in eye parts on each modular belt link. The hinge connection allows the belt links to bend out of the plane of the conveyor belt. As the force on the inside of the conveyor belt is substantially larger than the distributed force along the outside edge there will be an increased tendency to a buckling along the inside edge. As the width of the conveyor belt is assembled by a plurality of independent modular belt links which are only interconnected by the connection pin, the connection pin will also be exposed to forces perpendicular to the plane of the conveyor.

In the art various attempts have been made in order to address such problems. One example is EP 1377408 in which a radius limit adjuster is disclosed. The radius limit adjuster is inserted between adjacent belt links proximate a side edge of the conveyor belt. In order to fit a conveyor belt in a spiral device application, it is necessary to select a conveyor having a basic radius, and then fit the limiter to the belt. For other turning radiuses it is necessary to select an alternative basic belt having a different turning radius etc. The limiter is therefore not universal, and furthermore does not provide force distribution across the conveyor belt, whereby buckling and other detrimental occurrences will arise.

OBJECT OF THE INVENTION

It is therefore an object of the present invention to avoid these problems and to achieve a more even force distribution across the conveyor belt.

DESCRIPTION OF THE INVENTION

This is achieved by providing a restrictor clip, for use with modular conveyor belt links, where said belt links each has forwards and rearwards projecting eye parts, where said forward and rearward eye parts are offset, whereby it is possible to intercalate eye parts from one belt link between eye parts of an adjacent belt link, where the eye parts are provided with lateral apertures, such that as the eye parts overlap, a through-going aperture is provided, whereby a connecting rod may be inserted through overlapping apertures, thereby hingely connecting adjacent belt links, and where said apertures are oval, said aperture having a first longer axis being the longest cross distance in the aperture, and a second shorter axis, being the shortest cross distance in the aperture, and where said clip has a general U-shape, said U having two legs connected with a bridge portion in one end, and free ends in the opposite end, where in the free ends of the U, projecting members are provided, where said projecting members projects away from the U, and where the projecting members has a first dimension parallel to the legs smaller than the length of the first longer axis of the aperture in the belt link in which the clip is to be installed, and a second dimension perpendicular to the first dimension equivalent to or smaller than the length of the second shorter axis in the belt link in which the clip is to be installed, and where the lateral distance between the two legs of the U, is larger than the lateral extend of an eye part in the belt link in which the clip is to be installed.

By giving the clip a U-shape the projecting members are maintained in a relatively fixed relationship which when inserted into the apertures in the eye parts of the modular belt links assures that the clip is installed correctly. The projecting members serve to fill part of the space in the aperture in the eye parts such that the connecting rod is restricted in its movements whereby the flexibility of the conveyor chain is limited in a zone where the inventive clip is installed. Especially when arranging the restrictor clip approximated the inner side edge of the conveyor, when mounted in a spiral conveyor application, the restrictor clip restricts or fixes the collapsibility of the flexible conveyor belt such that it is possible to design the conveyor belt substantially precisely for the application in hand simply by arranging the restrictor clip in an appropriate distance from the inner side edge of the conveyor belt. Furthermore, as the connecting pin is restricted in its movement in the aperture it is possible to arrange the sprocket wheel which propels the conveyor belt such that it drives directly on the connecting rod. This is facilitated by the fact that the projecting members substantially fill the apertures such that a firm grip is achieved by the sprocket wheel on the connecting rod.

In a further advantageous embodiment the projecting members extend away from the U a distance substantially corresponding to the lateral width of an eye part in the belt link in which the clip is to be installed.

With this embodiment the connecting part between the two projecting members will act as a sort of spring ensuring that the projecting members stay in place inside the apertures and thereby limit the movements of the connecting rod in the elongated apertures in order to assure a firm and stable transferral of forces on the connecting rod.

In a still further advantageous embodiment of the invention the projecting member has two end faces, a first end face in use facing away from the belt link and a second end face facing the belt link, wherein the first end face is shaped as the inside of the aperture, against which it will be facing in use, and that the second end face is concave, having a radius corresponding to the radius of the connecting rod, where the projecting member, when inserted into the aperture in the eye part, leaves space for the connecting rod.

By further shaping the projecting members such that they snugly fit inside the apertures and still allows the connecting rod to be arranged in a hinge-like fashion it is further achieved that the restrictor clip by its installation changes the position of the tensioning loading from the outside of the flexible conveyor in the spiral device application to a position closer to the restricted clip and thereby makes it possible to both distribute and determine where the forces are to be carried by the conveyor belt. This is important in that in this manner it becomes possible to avoid vibration, buckling etc. in that the restrictor clip will reduce the belt pitch in the area where it is mounted such that the tension in a predetermined manner is directed in a certain area of the conveyor belt.

By further dimensioning the projecting members in such a way that a certain play is allowed for the connecting rod connecting two adjacent conveyor belt modules/links it is possible to design the conveyor belt in a manner where it is suitable to operate at a maximum and a minimum radius. This is interesting in that a number of spiral device constructions, whether it be an oven or a freezer, has a forward run of the conveyor operating at one radius whereas the return run due to the construction of the spiral device will have a different radius. Therefore by the dimensioning the restrictor clip appropriately it is possible to address both radiuses without sacrificing the advantages mentioned above.

In a still further advantageous embodiment of the invention the corner between the second end face and the leg of the U is provided with a substantial chamfered corner.

The chamfered corner is provided particularly for embodiments of the invention where the restrictor clip is used with modular belt links having an enlarged eye part portion at a distal end of each eye part such that as adjacent belt links collapse relative to each other the projecting members will not restrict the movement of the enlarged eye part portion usually arranged in a distal of the eye part. These enlarged portions of the eye part are provided in order to facilitate the transfer of larger forces due to the larger contact surface between the enlarged eye part portion and the connecting rod.

The invention is also directed at a spiral conveyor structure comprising a carrying structure on which are arranged means for supporting a modular conveyor belt along a predetermined path, where means including a sprocket wheel structure is provided for propelling said modular conveyor belt along said predetermined conveying path, where said modular conveyor belt is made from substantially identical modular belt links, where each belt link has forwards and rearwards projecting eye parts, where said forward and rearward eye parts are offset, whereby it is possible to intercalate eye parts from one belt link between eye parts of an adjacent belt link, where the eye parts are provided with lateral apertures, such that as the eye parts overlap, a through-going aperture is provided, whereby a connecting rod may be inserted through overlapping apertures, thereby hingely connecting adjacent belt links, and where said apertures are oval, said aperture having a first longer axis being the longest cross distance in the aperture, and a second shorter axis, being the shortest cross distance in the aperture, where said conveyor belt may comprise a plurality of modular belt links arranged laterally to make up the entire width of the conveyor belt, where one or more modular belt links are provided with a restrictor clip according to any of claims 1 to 4, and where the one or more sprocket wheels are arranged for driving engagement with the modular conveyor belt, such that teeth arranged on the sprocket wheel engages the connecting rod exposed between two eye parts.

The provision of the restrictor clip in this spiral conveyor structure does as already explained above hinder vibrations, buckling, etc. and thereby facilitates a much more smooth and even travel of the conveyor belt in the spiral conveyor structure. This in turn results in less wear, less chance of failure, less noise and all together improved usability of this spiral conveyor structure.

In a further advantageous embodiment this spiral conveyor structure is provided with a sprocket wheel structure where the sprocket wheel structure comprises a main drum, and where two sets of sprockets are arranged along the outer peripheries of end sections of said main drum, where the distance between the peripheries and thereby the two sets of sprockets is such that the sprockets will engage the connecting rod, having at least two eye parts distance between said sets of sprockets.

The fact that the connecting rod has been substantially fixated due to the provision of the restrictor clip, as discussed above, makes it possible to apply a drive force directly on to the connecting pin, and by further providing a sprocket wheel having two sets of sprockets arranged at a distance, the force transferral from the sprocket wheel connected to a driving motor to the conveyor belt may be achieved in a smoother manner which further improve the usability of the overall spiral conveyor structure.

Although the restrictor clip may be arranged laterally in any position across the conveyor belt in order to determine where the tension forces will be present, it is advantageous as disclosed in a further advantageous embodiment that the restricted clip is arranged adjacent an inner radius of said modular conveyor belt. In this manner the inner radius of the conveyor belt is alleviated from some of the tension that traditionally occurs with the engagement of the conveyor belt to the inner rotating a drum of the spiral construction and further more the outside of the modular conveyor belt is relieved from the tension which typically arises due to the engagement between the driving drum along the inside radius of the conveyor belt.

The invention is further more directed at a method of fitting a conveyor belt with a restrictor clip as disclosed above in a spiral conveyor structure as also disclosed above wherein the clip is arranged adjacent an inner edge of said conveyor belt, when the belt is arranged on a spiral conveyor structure, where the clip is arranged by forcing the two projecting members towards each other, superposing the members with the apertures provided in the eye parts of the modular belt links and inserting the projecting members inside the apertures, whereby the member connecting the projecting members will be biased such that the projecting members will be maintained inside the apertures.

The invention is directed to a restrictor clip, for use with modular conveyor belt links, as well as a spiral conveyor structure, comprising a conveyor belt made from modular belt links, where said belt links each has forwards and rearwards projecting eye parts, where said forward and rearward eye parts are offset, whereby it is possible to intercalate eye parts from one belt link between eye parts of an adjacent belt link, where the eye parts are provided with lateral apertures, such that as the eye parts overlap, a through-going aperture is provided, whereby a connecting rod may be inserted through overlapping apertures, thereby hingely connecting adjacent belt links, and where said apertures are oval, said aperture having a first longer axis being the longest cross distance in the aperture, and a second shorter axis, being the shortest cross distance in the aperture, wherein said clip has a general U-shape, said U having two legs connected with a bridge portion in one end, and free ends in the opposite end, where in the free ends of the U, projecting members are provided, where said projecting members projects away from the U, and where the projecting members has a first dimension parallel to the legs smaller than the length of the first longer axis of the aperture in the belt link in which the clip is to be installed, and a second dimension perpendicular to the first dimension equivalent to or smaller than the length of the second shorter axis in the belt link in which the clip is to be installed, and where the lateral distance between the two legs of the U, is larger than the lateral extend of an eye part in the belt link in which the clip is to be installed.

BRIEF DESCRIPTION OF THE DRAWINGS

FIG. 4 illustrates the arrangement of the projecting parts in an elongated aperture in an eye part. The cross-section is done along line AA in FIG. 1a.

DETAILED DESCRIPTION OF THE INVENTION

Figure 1:
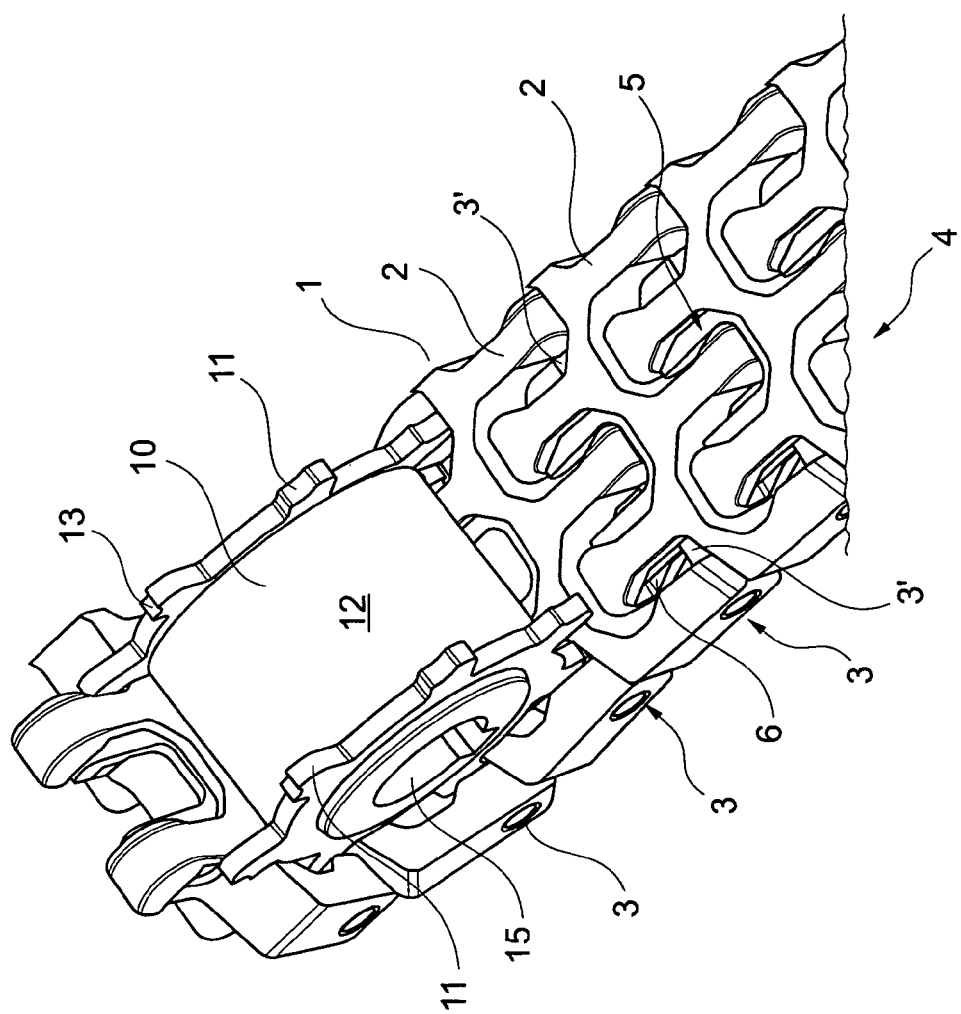
FIG. 1 is a perspective view of a socket and a partial conveyor belt with links and restrictor clips mounted on the links and pins extending through the links.

In FIG. 1 details of the invention are illustrated in a sectional view of a conveyor belt. In this embodiment only the inner section of the conveyor belt is illustrated and it is to be understood that the conveyor belt may have any desired width built up in a traditionally manner of constructing modular conveyor belts.

Furthermore, FIG. 1 illustrates the under side of the conveyor belt in a section of the conveyor belt where a sprocket wheel 10 is engaging the conveyor belt 1. Each modular conveyor belt module 2 is interconnected by means of a connecting rod 3 such that adjacent modular beltings may pivot in a hinge-like manner relative to each other as indicated to the left in FIG. 1 where the modular conveyor belt is bend upwards.

Adjacent a side edge 4 of the conveyor belt is arranged restrictor clips 5 according to the invention. The restrictor clip 5 is provided in the apertures such that the movement of the connecting rod in elongated apertures provided in the eye parts 6 is severely limited whereby the sprockets 11 of the sprocket wheel 10 are able to firmly engage the exposed part 3' of the connecting rod in order to propel the conveyor belt 1.

The sprocket wheel construction 10 comprises a main drum 12 and along the end peripheries of the main drum 12 is arranged sprocket teeth 11 which are shaped with a concave distal end 13 such that a firm engagement with the exposed part of the connecting pin 3' may be achieved in order to propel the conveyor belt 1. A large aperture 15 is provided in the sprocket wheel drum 12 where a drive axle connected to a motor may be inserted in order to rotate the sprocket wheel structure 10.

Figure 2:
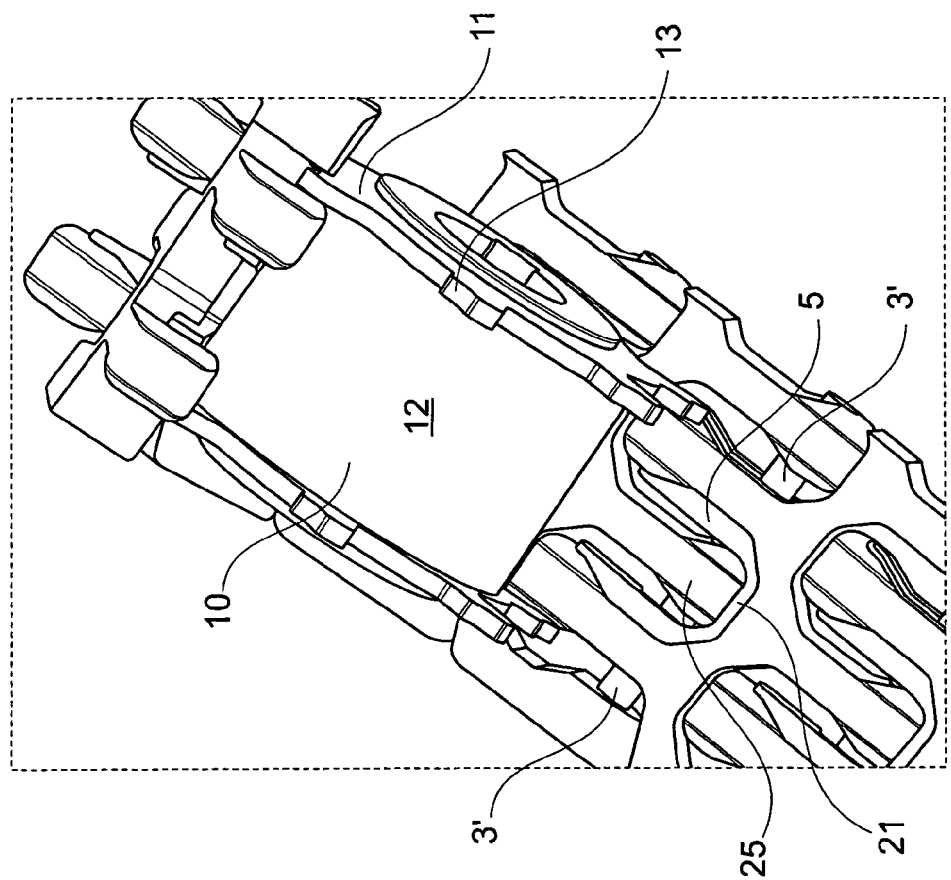
FIG. 2 is an enlarged perspective view of a socket and a partial conveyor belt with links and restrictor clips mounted on the links and pins extending through the links.

In FIG. 2 the same features are evident while seen from a different angle.

Figure 3:
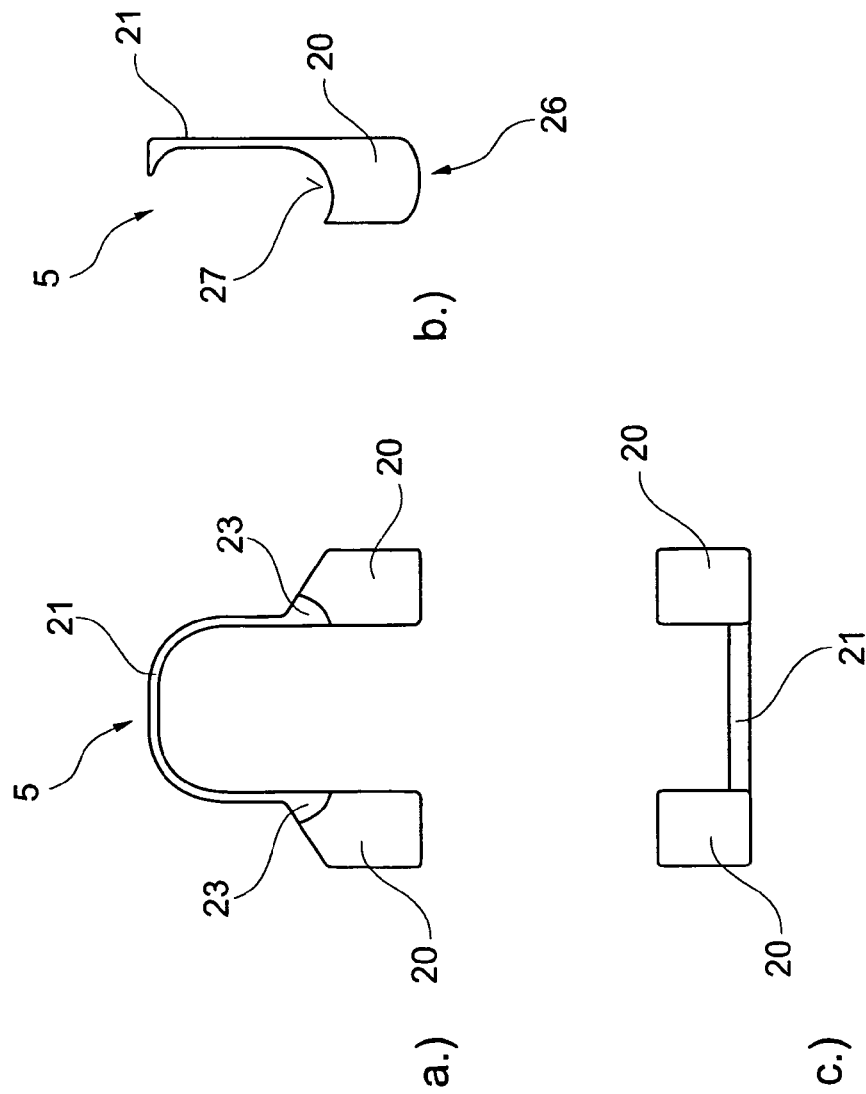
FIGS. 3a, 3b and 3c respectively show a plan view, side elevation and end elevation of a restrictor clip.
Figure 4:
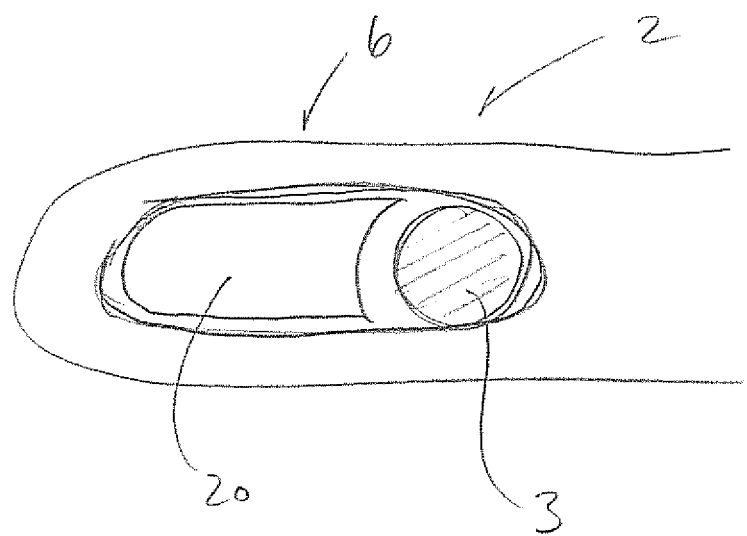

FIGS. 3 a), b) and c) illustrate the restrictor clip from various angles. In FIG. 3a the restrictor clip 5 is seen in plane view from above. The restrictor clip has a general U-shape where the distal ends of the parallel portions of the clip are provided with projecting members 20. Connecting the two projecting members 20 is a bridge section 21 which in use will be positioned adjacent the bottom of the space between two eye parts as illustrated in FIG. 2. In this embodiment the projecting members 20 are provided with chamfered sections 23. These sections 23 are provided in order to accommodate enlarged eye portions 25 (see FIG. 2). The enlarged eye portions 25 are as already explained above provided in order to distribute the load on the eye part such that the assembled conveyor belt may be able to carry larger loads and distribute the load evenly along the connecting rod 3.

In FIG. 3b is illustrated a cross section through a restrictor clip 5 from which it is evident that the connection section 21 has a substantially smaller cross section than the projecting members 20. The projecting members are dimensioned such that they will fit inside the apertures provided in the eye parts 25 of the modular belt links and are further provided with a concave outer section 26 and a convex inner section 27. The concave outer section 26 is provided in order to make the projecting member 20 fit snugly against the inside of the aperture whereas the inner convex section 27 is provided in order to accommodate a part of the periphery of the connecting rod 3 as both the restrictor clip and the connecting rod are inserted in an assembled conveyor belt as described above.

Above, the invention has been explained with reference to a particular embodiment but it should be understood that the invention shall not be restricted beyond the scope of protection afforded by the appended claims.

The invention claimed is:

1. Modular conveyor belt apparatus, made from a plurality of modular belt links, where said belt links each has forwards and rearwards projecting eye parts, where said forward and rearward eye parts are offset, whereby overlapping eye parts are intercalated from one belt link between eye parts of an adjacent belt link, where the eye parts are provided with lateral apertures, such that as the eye parts overlap, a through-going aperture is provided, whereby a connecting rod is inserted through overlapping apertures, thereby hingely connecting adjacent belt links into the modular conveyor belt, and where said apertures are oval, said aperture having a first longer axis being the longest cross distance in the aperture, and a second shorter axis, being the shortest cross distance in the aperture, wherein one or more restrictor clips is/are provided in said conveyor belt between the overlapping forwards and rearwards eye parts of adjacent belt links within the modular conveyor belt, wherein each of said clips has a general U-shape, said U having two legs connected with a bridge portion in one end, and free ends in the opposite end, where in the free ends of the U, projecting members are provided, where said projecting members projects away from the U, and where each of the projecting members has a first dimension parallel to the legs smaller than the length of the first longer axis of the aperture in the belt link in which the clip is installed, and a second dimension perpendicular to the first dimension equivalent to or smaller than the length of the second shorter axis in the belt link in which the clip is installed, and where the lateral distance between the two legs of the U, is larger than the lateral extend of an eye part in the belt link in which the clip is installed.

2. The apparatus according to claim 1, wherein the projecting members extends away from the U a distance substantially corresponding to the lateral width of an eye part in the belt link in which the clip is installed.

3. The apparatus according to claim 1, wherein the projecting member has two end faces, a first end face in use facing away from the belt link and a second end face facing the belt link, wherein the first end face is shaped as the inside of the aperture, against which it will be facing in use, and that the second end face is concave, having a radius corresponding to the radius of the connecting rod, where the projecting member, when inserted into the aperture in the eye part, leaves space for the connecting rod.

4. The apparatus according to claim 3, wherein the corner between the second end face and the leg of the U is provided with a substantial chamfered corner.

5. Spiral conveyor structure comprising a carrying structure on which are arranged means for supporting a modular conveyor belt along a predetermined path, where means including one or more sprocket wheels are provided for propelling said modular conveyor belt along said predetermined conveying path, where said modular conveyor belt is made from substantially identical modular belt links, where each belt link has forwards and rearwards projecting eye parts, where said forwards and rearwards eye parts are offset, whereby overlapping eye parts from one belt link are intercalated between eye parts of adjacent belt links, where the eye parts are provided with lateral apertures, such that as the eye parts overlap, a through-going aperture is provided, whereby a connecting rod may be inserted through overlapping apertures, thereby hingely connecting adjacent belt links, and where said apertures are oval, said aperture having a first longer axis being the longest cross distance in the aperture, and a second shorter axis, being the shortest cross distance in the aperture, where said conveyor belt may comprise a plurality of modular belt links arranged laterally to make up the entire width of the conveyor belt, where one or more modular belt links are provided with restrictor clips between the overlapping forwards and rearwards projecting eye parts of the adjacent belt links within said modular conveyor belt, and where the one or more sprocket wheels are arranged for driving engagement with the modular conveyor belt, such that teeth arranged on the sprocket wheel engage the connecting rods exposed between the intercalated eye parts.

6. Spiral conveyor structure according to claim 5 wherein the sprocket wheel structure comprises a main drum, and where two sets of sprockets are arranged along the outer peripheries of end sections of said main drum, where the distance between the peripheries and thereby the two sets of sprockets is such that the sprockets will engage the connecting rod, having at least two eye parts distance between said sets of sprockets.

7. Spiral conveyor structure according to claim 5 wherein the restrictor clip is arranged adjacent an inner radius of said modular conveyor belt.

8. Method comprising fitting a conveyor belt with a restrictor clip in a spiral conveyor structure, wherein the clip is arranged adjacent an inner edge within said conveyor belt, when the belt is arranged on the spiral conveyor structure, where the clip is inserted in the belt by forcing two projecting members towards each other, superposing the members with apertures provided in eye parts of modular belt links and inserting the projecting members inside the apertures, whereby the restrictor clip connecting the projecting members are biased away from each other such that the projecting members are maintained inside the apertures.

* * * * *